July 26, 1932.  G. B. EGGERT  1,869,189
TRANSMISSION
Filed Sept. 20, 1929
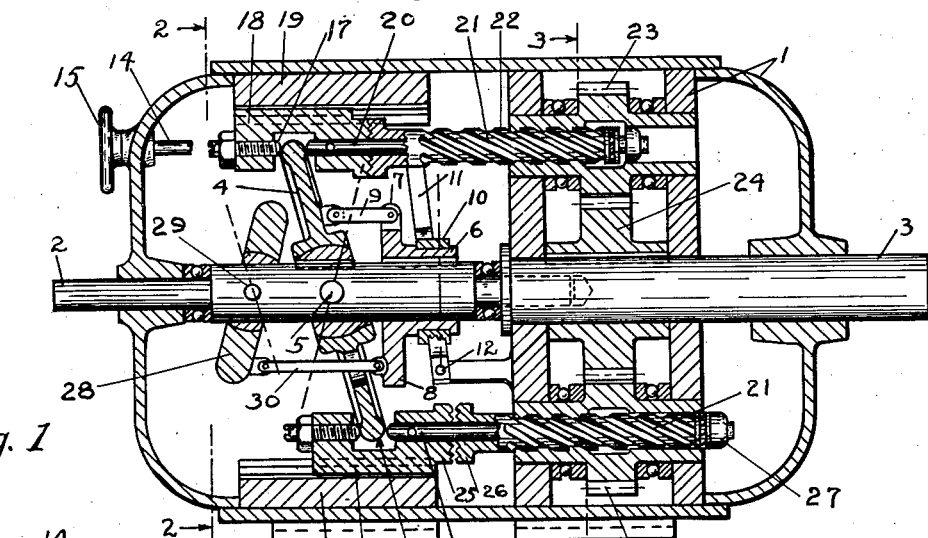
Fig. 1
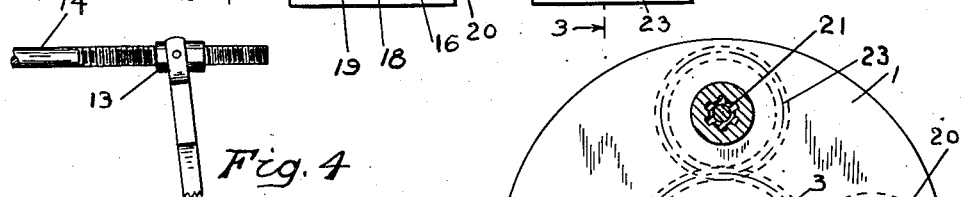
Fig. 4
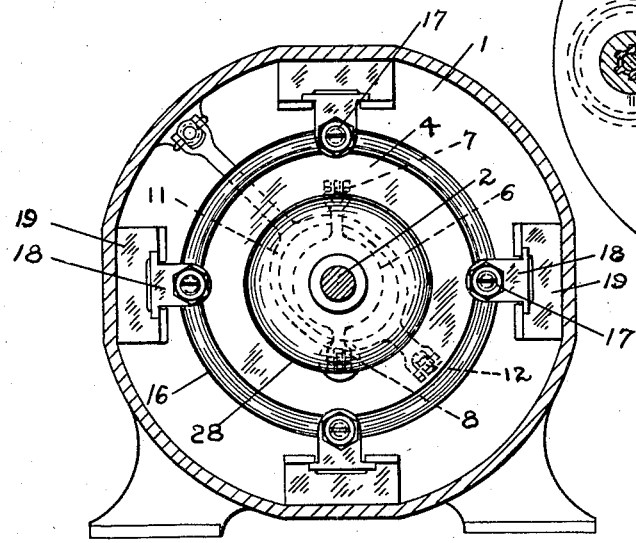
Fig. 3
Fig. 2
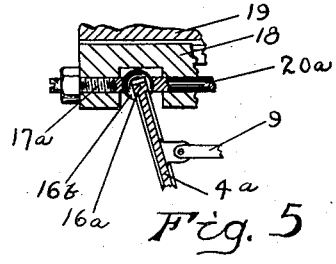
Fig. 5
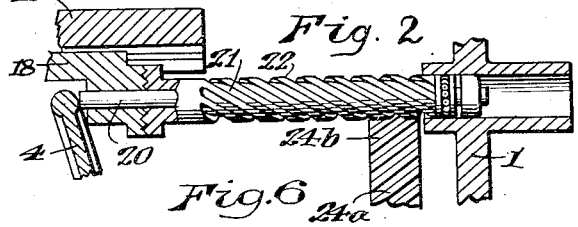
Fig. 6
INVENTOR
Gustav B. Eggert.

Patented July 26, 1932

1,869,189

UNITED STATES PATENT OFFICE

GUSTAV B. EGGERT, OF SAGINAW, MICHIGAN

TRANSMISSION

Application filed September 20, 1929. Serial No. 393,949.

This invention relates to transmissions and pertains more particularly to variable speed transmissions in which the power input or driving shaft is rotated at a constant speed and the speed of the power output or driven shaft may be varied from zero to the maximum speed for which the transmission is designed.

The objects of my invention are to provide a new, novel and useful means for transmitting rotary motion from the driving shaft to a driven shaft by providing means on the driving shaft for imparting rectilinear reciprocating motion, in sequence, to a plurality of transmission members or rods which in turn are adapted by circumvolutions or helices to impart rotary motion to the driven shaft by suitable gears and pinions.

In carrying out this object of my invention I provide a driving disc secured to, and adapted to rotate with, the driving shaft. The driving disc is tiltable so that the plane of the driving disc is at an angle to the axis of the driving shaft and it is this angularity of the driving disc in relation to the driving shaft that determines the ratio of speed between the two aforementioned shafts.

Operatively connected to and disposed radially about the driving disc are the transmission rods which are rectilinearly reciprocated by the wobble or axial movement of the driving disc rim as it rotates with the driving shaft.

Circumvolutions or helices are provided to operatively connect the transmission rods to the driven shaft through suitable gearing and thereby convert the reciprocatory motion of the transmission rods into rotary motion of the driven members.

A further object of this invention is to provide means for counterbalancing the driving disc and thereby eliminate vibrations, which would otherwise be present in the transmission, due to the wobbling motion of the driving disc, and thus insure smoothness of operation.

This object is accomplished by providing a counterbalance on the driving shaft. The counterbalance is connected to the driving disc shifting mechanism so that when the driving disc is tilted in one direction the counterbalance is tilted in the opposite direction at an angle equal to the angle of the driving disc, thus a static and dynamic balance is maintained between the two members.

A still further object is to provide means for insuring flexible, positive contact between the transmission rods and the driven members so that overrunning of the driven member is avoided and smoothness of operation is assured.

This object is accomplished by providing clutches on the transmission rods and the driving members so that when the transmission rod is about to take up its driving load and should the driven member be rotating at a speed different from the relative linear speed of the transmission rod the clutch members will automatically disengage and the transmission rod will rotate with the driven member until such time as the speeds are equal, when the clutch member will again engage. The rotation of the transmission rods will cease and the rectilinear motion will again be converted into rotary motion by the circumvolutions to drive the driven shaft.

A still further object is to provide a transmission in which the speed of the driven member may be quickly and easily varied from zero to the maximum without undue stresses or strains on the parts of which it is composed.

With these and certain other objects in view, which will appear later in the specification, my invention comprises the devices described and claimed and the equivalents thereof.

In the accompanying drawing:

Fig. 1 is a longitudinal vertical section through a transmission embodying a preferred form of my invention.

Fig. 2 is a vertical cross-section on the line 2—2 of Fig. 1.

Fig. 3 is a vertical cross-section on the line 3—3 of Fig. 1 showing the gearing arrangement.

Fig. 4 is a detail of the driving disc tilting or speed change mechanism which is not visible in Fig. 1.

Fig. 5 is a modified form of the driving parts shown in Fig. 1.

Fig. 6 is a detail of a modified form of connection between the circumvolutions and driven gear when it is desired to secure a greater maximum reduction of speed between the driving and driven members.

As is clearly shown in the drawing 1 is the frame of a transmission carrying a driving shaft 2 and a driven shaft 3 preferably arranged in axial alignment with each other.

The driving shaft 2, to which power is applied, carries a driving disc, 4, which rotates with and is secured thereto by a pivot pin 5 fixed in the shaft 2 and about which the driving disc 4 may be tilted.

A suitable shifting mechanism of any design is employed to vary the angularity of the driving disc. For purposes of illustration I show a preferred form of shifting mechanism consisting of a collar 6 having two diametrically opposed arms 7 and 8 extending radially therefrom. One arm as 7 is connected to the driving disc 4 by a link 9 and the other arm 8 is connected to the counterbalance the operation of which will be described later.

The collar 6 is splined to the driving shaft 2 so that it may move axially on the shaft while rotating with it. The collar 6 also has a stationary shifting ring 10 having a shifting arm or yoke 11 pivoted thereto as is usual in shifter design. One end of the shifter yoke is fulcrumed to the frame as at 12 and the other end carries a screw thread nut 13 through which passes a threaded shaft 14. A hand wheel 15 is secured to the screw threaded shaft 14 so that when the hand wheel 15 is rotated the threads on the shaft 14 by its threaded connection to the shifting yoke 11 moves the yoke and thus the shifting collar 6 is moved axially on the driving shaft 2 and the driving disc 4 is tilted into any desired angular position.

The driving disc 4 is preferably made with an annular rim 16 which passes through bearings 17 carried by a cross-head 18 slidably mounted in ways 19 secured to the frame. One of the bearings as 17 is made adjustable so that wear of the rim 16 of the driving disc 4 or bearing may be compensated for. The other bearing is formed on the end of a shaft 20 secured in the crosshead 18.

In Fig. 5 I show a modified form of connection between the driving disc and cross-head and which insures a closer contact between the driving parts to eliminate back lash and binding of the said parts.

Revolubly received between the bearing 17a and shaft 20a is a ball 16b having a slot through which passes the rim 16a of driving disc 4a.

By this arrangement the ball 16b is free to revolve betwen the bearing 17a and shaft 20a without binding or backlash.

Rotatably mounted on the shaft 20 is the transmission rod 21 having circumvolutions or helices 22 formed thereon and engaging internal circumvolution formed in a driving pinion 23 which meshes with a driven gear 24 keyed to the driven shaft 3.

One end of the transmission rod 21 has fixed thereto a clutch member 26 adapted to engage, when in driving position, a second clutch member 25 fixed to the crosshead 18. The clutch members are preferably of circular form with radial teeth formed on their faces.

Secured on the opposite end of the shaft 20 is a collar 27 spaced from the transmission rod 21 a distance slightly greater than the depth of the teeth of the clutch members 25 and 26. The object of this arrangement will be explained shortly. The operation of the transmission is as follows:

Assuming that the driving disc, 4, is in neutral position, that is, a position in a plane perpendicular to the axis of the driving shaft 2, power is applied to the driving shaft which rotates at a constant speed carrying with it the driving disc 4 and shifting mechanism. The rim 16 of the driving disc rotates freely between the bearings 17 and end of shaft 20, there being no axial movement of the disc rim 16, the driven shaft 3 remaining stationary.

To rotate the driven shaft 3 the hand wheel 15 is rotated drawing the shifting yoke 11, shifting ring 10 and shifting collar 6 to the left as seen in Fig. 1. This tilts the driving disc 4 so that it rotates with a wobbling motion, that is the rim 16 moves in a direction parallel to the axis of the driving shaft 2 and by reason of its connection to the crosshead 18 imparts rectilinear motion to the same. The clutch member 25 on the crosshead 18 engages the clutch member 26 on the transmission rod 21 which then moves forward without rotation. The circumvolutions 22 on the transmission rods 21 by the angular thrust against the internal circumvolution in the pinions 23 rotates the pinions and they in turn rotate the driven shaft 3 through the driven gear 24.

The speed of the reciprocating transmission rod 21, and consequently the speed of the driven shaft by its connection with the transmission rod, is governed by the angular relation of the driving disc 4 with the driving shaft 2, because, as the peripheral speed of the driving disc rim 16 is constant the speed of the axial movement is governed by the angle at which the driving disc is set.

If the driving disc be set at a slight angle, the axial movement of the disc rim 16 is equal to the base of a triangle whose hypothenuse is the diameter of the driving disc, therefore, in one-half revolution of the driving disc the rim moves across the base of the triangle in one direction and returns during the next one-half revolution.

If now the driving disc be tilted at a greater angle the length of the base of the triangle will also be increased. The rim 16 of the driving disc, however, must travel across this increased base in the same space of time as when the base of the angle was shorter, namely, in the time required for one-half revolution, therefore the axial speed of the rim is increased and consequently the reciprocation of the transmission rods 21 is increased so, also, is the speed of the driven shaft 3 through its connecting parts.

When the driving disc rim 16 moves axially in the opposite direction during the next one-half revolution the crosshead 18 and attached shaft 20 moves with it until the collar 27 on the opposite end of the shaft engages the end of the transmission rod 21. The two clutch members 25 and 26 are disengaged and the transmission rod is free to rotate on shaft 20 as it is withdrawn from pinion 23. The next forward movement of the driving disc and crosshead will again cause the clutches to engage and the transmission rod will take up its driving load.

The relative positions of the transmission rods are best shown in Fig. 1 in which the top transmission rod is shown at the beginning of its working stroke. The clutch members 25 and 26 are in engagement with each other and the collar 27 is spaced apart from the end of the transmission rod.

The transmission rod shown in the lower portion of the view has completed its working stroke and is about to be withdrawn from the pinion. The clutch members are out of engagement with each other and the collar 27 is drawn against the end of the transmission rod 21.

Should the speed of the driven shaft 3 be greater than the rectilinear speed of the transmission rods, the driven gear 24 and pinion 23 will rotate the transmission rod 21 and due to the clearance between its end and collar 27 it will be drawn out of engagement with the clutch member 25 on the crosshead 18 until such time as the speeds of the driving shaft and driven shaft are equal or the driving shaft speed is greater than the speed of the driven shaft. The transmission rod will then take up its driving load.

While I have described a single driving unit consisting of the transmission rod 21 crosshead 18 and pinion 23 and associated parts, I have shown a plurality of units, four in fact, which is desirable to produce a smooth flow of power and speed from the driving member to the driven member. When it is desired to produce a greater reduction of speed between the driving and driven shafts, the pinions may be dispensed with and spiral teeth 24a formed on the driven gear 24b to mesh with the circumvolutions of the transmission rod 21 as shown in Fig. 6. This arrangement produces a still greater reduction in maximum speed between the driving and driven members, and permits the introduction of more transmission rods without increasing the size of the casing. This latter feature permits greater and smoother flow of power to be transmitted by the driven shaft.

To further improve the operation of this invention, the vibrations, caused by the wobble of the driving disc 4 when set at a driving angle, are eliminated by means about to be described. In practice I provide a counterbalance 28, as previously related, which is also pinned to the driving shaft 2 and which is adapted to rotate therewith.

To maintain a static and dynamic balance of the unbalanced forces set up by the driving disc 4, the counterbalance 28 is pivoted to the driving shaft 2 by a pivot pin 29 and is tilted at an equal and opposite angle to the driving disc 4 simultaneously therewith by the driving disc shifting mechanism.

Arm 8 of shifting collar 6 is connected to the counterbalance 28 by link 30 so that when the shifting collar 6 is moved axially to tilt the driving disc 4 in one direction the counterbalance 28 is tilted in the opposite direction at an angle equal to the angle of the driving disc, thus a static and dynamic balance is maintained between the two members, and vibration, wear, and noise are eliminated.

In practice I prefer to enclose the entire mechanism in an oil-tight casing so that the moving parts may operate in an oil bath to increase the life of the machine as well as its efficiency.

While I have described a preferred form of my invention there are a number of changes in design that could be made without departing from the spirit of my invention.

My prime inventive idea is to provide a transmission in which rotary motion of a driving member is converted into rectilinear reciprocatory motion and through the angular thrust of circumvolutions by said reciprocatory motion produce rotary motion in a driven member at a speed which may be varied at will.

Having thus described my invention, what I claim and desire to secure by Letters Patent is:

1. In a transmission the combination of a frame, a driving shaft and a driven shaft journaled in said frame in axial alignment with each other and adapted for independent rotation, a driving disc on said driving shaft adapted to be tilted in angular relation to said driving shaft, means for tilting said driving disc, a counter-balance on said driving shaft adapted to be tilted at an equal and opposite angle to said driving disc by said tilting means, a plurality of ways fixed to said frame, crossheads in said ways, said crossheads operatively connected to the rim of said driving disc, clutch members on said crossheads, shafts secured to said crossheads, transmission rods rotatably mounted on said shafts, clutch members on said transmission rods adapted to engage said first-named clutch members, circumvolutions on said transmission rods, pinions having internal circumvolutions engaging the circumvolutions on said transmission rods, and a gear on said driven shaft in mesh with said pinions, for the purposes set forth.

2. In a transmission the combination of a frame, a driving shaft and a driven shaft journaled in said frame in axial alignment with each other and adapted for independent rotation, a driving disc on said driving shaft adapted to be tilted in angular relation to said driving shaft, means for tilting said driving disc, a counter-balance on said driving shaft adapted to be tilted at an equal and opposite angle to said driving disc by said tilting means. Ways fixed to said frame, a cross-head in said ways, said cross-head operatively connected to said driving disc, a clutch member on said cross-head, a shaft secured to said cross-head, a transmission rod rotatably mounted on said shaft, a clutch member on said transmission rod adapted to engage said first named clutch member, circumvolutions on said transmission rod, a pinion on said transmission rod having internal circumvolutions in mesh with the circumvolutions of said transmission rod and a gear on said driven shaft in mesh with said pinion, for the purposes set forth.

3. In a transmission, the combination of a frame, a driving shaft and a driven shaft journaled in said frame, a driving disc on one of said shafts, and adapted to be tilted in angular relation to said shaft, means for tilting said driving disc, a counter-balance rotating with and adapted to be tilted at an equal and opposite angle to said driving disc, ways fixed to said frame, a cross-head in said ways, said cross-head operatively connected to said driving disc, a clutch member on said cross-head, a shaft secured to said cross-head, a transmission rod rotatably mounted on said shaft, a clutch member secured to said transmission rod adapted to engage said first-named clutch member, circumvolutions on said transmission rod, a pinion on said transmission rod and having internal circumvolutions in engagement with the circumvolutions of said transmission rod and a gear on said driven shaft in mesh with said pinion for the purposes set forth.

4. In a transmission, the combination of a frame, a driving shaft and a driven shaft carried by said frame, a driving disc on one of said shafts and adapted to be tilted in angular relation to said shaft, means for tilting said driving disc, a counter-balance rotated with and adapted to be tilted at an equal and opposite angle to said driving disc, ways carried by said frame, a cross-head in said ways, said cross-head operatively connected to said driving disc, a clutch member on said cross-head, a shaft secured to said cross-head, a transmission rod rotatably mounted on said shaft, a clutch member secured to said transmission rod adapted to engage said first-named clutch member, circumvolutions on said transmission rod, a pinion on said transmission rod and having internal circumvolutions in engagement with the circumvolutions of said transmission rod and a gear on said driven shaft in mesh with said pinion, for the purposes set forth.

5. In a transmission the combination of a frame, a driving shaft and a driven shaft carried by said frame, a driving disc on one of said shafts and adapted to be tilted in angular relation to said shafts, means for tilting said driving disc, a counter-balance rotatable with and adapted to be tilted in angular relation to said driving disc, ways carried by said frame, a cross-head in said way, said cross-head operatively connected to said driving disc, a clutch member on said cross-head, a transmission rod on said cross-head, a clutch member on said transmission rod adapted to engage said first-named clutch member, circumvolutions on said transmission rod, a pinion having internal circumvolutions engaging the circumvolutions of said transmission rod, and a gear on said driven shaft in mesh with said pinion, for the purposes set forth.

6. In a transmission, the combination of a frame, a driving shaft and a driven shaft carried by said frame, a driving disc on one of said shafts and adapted to be tilted in angular relation thereto, means for tilting said driving disc, means for dynamically and statically balancing said driving disc at its various angular positions, guides carried by said frame, transmission rods slidingly received in said guides and operatively connected to said driving disc, clutch members adapted to engage and disengage said transmission rods and said driving disc, circumvolutions on said transmission rods, pinions having means adapted to be operatively engaged by said circumvolutions and a gear on said driven shaft in mesh with said pinions for the purposes set forth.

7. In a transmission the combination of a frame, a driving shaft and a driven shaft carried by said frame, a driving disc on one of said shafts, and adapted to be tilted in angular relation thereto, means for tilting said disc, a plurality of guides radially disposed about said shafts and carried by said frame, transmission rods slidably received in said guides and operatively connected to said driving disc, clutch members adapted to engage and disengage said transmission rods and said driving disc, circumvolutions on said transmission rods and reciprocable therewith, pinions having means to be operatively engaged by the circumvolutions of said transmission rods and a gear on said driven shaft in mesh with said pinions, for the purposes set forth.

8. In a transmission, the combination of a frame, a driving shaft and a driven shaft carried by said frame, a driving disc on one of said shafts and adapted to be tilted in angular relation thereto, means for tilting said driving disc, a counter-balance rotated with and adapted to be tilted at an equal and opposite angle to said driving disc whereby a static and dynamic balance is maintained between said disc and said counterbalance, guides carried by said frame, transmission rods slidingly received in said guides and operatively connected to said driving disc, clutch members adapted to engage and disengage said transmission rods and said driving disc, circumvolutions on said transmission rods, and a gear on said driven shaft operatively connected to said transmission rods, for the purposes set forth.

9. In a transmission, the combination of a frame, a driving shaft and a driven shaft carried by said frame, a driving disc on one of said shafts and adapted to be tilted in angular relation thereto, means for tilting said driving disc, a plurality of guides radially disposed about said shafts and carried by said frame, transmission rods slidingly received in said guides and operatively connected to said driving disc, clutch members adapted to engage and disengage said transmission rods and said driving disc, circumvolutions on said transmission rods, and a gear on said driven shaft in mesh with the circumvolutions on said transmission rods, for the purposes set forth.

10. In a transmission of the class described having a driving and a driven shaft, a driving disc mounted on the driving shaft and adapted to be tilted, means connected to the driven shaft and operated by the driving disc to transmit rotary motion to the driven shaft, means for tilting the driving disc to vary the ratio of speed between the driving and driven shafts, in combination with a counter-balance connected to the driving disc adapted to be tilted at an equal and opposite angle to said driving disc whereby a static and dynamic balance is maintained between said disc and said counter-balance for the purposes set forth.

In testimony whereof, I affix my signature.
GUSTAV B. EGGERT.